United States Patent
Zelger

(10) Patent No.: US 6,804,596 B2
(45) Date of Patent: Oct. 12, 2004

(54) METHOD AND DEVICE FOR FIRING AT LEAST ONE FIRING ELEMENT FOR A RESTRAINING DEVICE OF A VEHICLE

(75) Inventor: Christian Zelger, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/239,922

(22) PCT Filed: Mar. 26, 2001

(86) PCT No.: PCT/DE01/01162
§ 371 (c)(1),
(2), (4) Date: Sep. 27, 2002

(87) PCT Pub. No.: WO01/72556
PCT Pub. Date: Oct. 4, 2001

(65) Prior Publication Data
US 2003/0040860 A1 Feb. 27, 2003

(30) Foreign Application Priority Data
Mar. 29, 2000 (DE) .......................................... 100 15 688

(51) Int. Cl.⁷ .......................... G06F 17/00; B60R 22/00
(52) U.S. Cl. .................. 701/45; 280/735; 180/282; 180/288; 180/271; 340/438; 340/439
(58) Field of Search .................. 701/45, 36; 280/735; 180/282, 271, 268; 340/438, 439

(56) References Cited

U.S. PATENT DOCUMENTS

| | | | |
|---|---|---|---|
| 5,521,822 A | * 5/1996 | Wang | ........................... 701/45 |
| 5,916,289 A | 6/1999 | Fayyad et al. | |
| 6,392,558 B1 | * 5/2002 | Schulmeyer et al. | ... 340/825.52 |
| 6,533,316 B2 | * 3/2003 | Breed et al. | ................. 280/735 |

FOREIGN PATENT DOCUMENTS

| | | |
|---|---|---|
| DE | 39 25 594 A1 | 3/1990 |
| DE | 44 25 254 A1 | 1/1996 |
| DE | 97 40 019 A1 | 3/1999 |
| DE | 197 39 808 A1 | 3/1999 |
| DE | 197 40 021 A1 | 3/1999 |
| EP | 0 402 622 A1 | 12/1990 |
| EP | 0 471 871 A1 | 2/1992 |
| EP | 0 849 122 A2 | 6/1998 |

\* cited by examiner

Primary Examiner—Thomas G. Black
Assistant Examiner—Ronnie Mancho
(74) Attorney, Agent, or Firm—Morrison & Foerster LLP

(57) ABSTRACT

The invention relates to a method and a device for triggering at least on firing element for restraining means in a motor vehicle. In said method and device a firing command is transmitted from a control unit to a firing device for the firing elements. The firing command is subsequently repeatedly n-fold, whereby n is at least equal to 1. The n+1 transmitted firing commmands are evaluated in the firing device and once the last of the n+1 firing commands has been transmitted, the firing elements are triggered.

11 Claims, 2 Drawing Sheets

METHOD AND DEVICE FOR FIRING AT LEAST ONE FIRING ELEMENT FOR A RESTRAINING DEVICE OF A VEHICLE

CLAIM OF PRIORITY

This application claims priority to International Application No. PCT/DE01/01162 which was published in the German language on Oct. 4, 2001.

TECHNICAL FIELD OF THE INVENTION

The invention relates to a method and a device for firing at least one firing element for a restraining device in a motor vehicle.

BACKGROUND OF THE INVENTION

Arrangements for firing a restraining device in a motor vehicle usually have a sensor for detecting an accident, a control device which is connected downstream of the sensor, the firing device which is arranged spatially separated from the control device and is connected to it via a line, and at least one firing element (for example a firing cap) for the restraining device, the firing element being electrically connected to the firing device.

If, for example, a plurality of firing caps are to be fired simultaneously in such a context using a firing command, but not all the firing caps detect the first firing command and/or fire, the transmission link which is usually embodied as a firing bus between the control device and the firing device may, under certain circumstances, be disrupted to such an extent that no further firing commands can be transmitted. This is the case, for example, if a short circuit or an interruption at the bus occurs as a result of individual undesired detonations. It is then no longer possible to fire the remaining firing caps since no further firing command can be transmitted.

SUMMARY OF THE INVENTION

The invention discloses a method and an arrangement for firing at least one firing element for a restraining device in a motor vehicle which provides a higher degree of immunity to faults.

In one embodiment of the invention, there are firing commands as the first to be transmitted repeatedly (for example 3 times), for firing to be delayed during this time, and for firing of the firing elements, for example by means of the first firing command, to be permitted after the multiple transmission.

In the embodiment, there is a method in which a firing command is transmitted, and then the firing command is transmitted n times, from a control device to a firing device for the firing element/elements, n being at least equal to 1. Then, the n+1 transmitted firing commands are evaluated in the firing device and the firing element or elements is/are fired by the firing device after the transmission of the last n+1, for example by the first firing command.

In one aspect of the invention, the firing actuation of the firing elements is preferably repeated at least once or, for the sake of simplicity, coupled to the number of transmitter firing commands in order to fire firing elements which have erroneously not yet been fired. Moreover, in addition to simultaneous firing of the plurality of firing elements, it is also possible to provide for the chronologically offset firing of the firing elements so that the firing elements are fired in succession.

In another embodiment of the invention, there is a device including a control device for generating n+1 identical firing commands, a firing device for firing the at least one firing element by connecting the firing signal to the firing element, and a transmission device for the transmission of the firing commands by the control device to the firing device. The firing element is not fired by the firing device until after the transmission of the last of the n+1 firing commands, for example by the first firing command.

In one aspect of the invention, in order to ensure that the firing of the firing element or elements takes place after the last of the n+1 firing commands has been transmitted, with the control device a delay device is provided for delaying the firing signal, the delay device being fired by the first firing command and having a delay which is longer than the time which is necessary for the transmission of the firing commands. The use of a delay device makes it possible for the firing element or elements to be operated in such a way that firing cannot disrupt the transmission of the firing commands and/or said firing elements are not made to fire until the firing signal has been repeated several times.

In another aspect of the invention, in order to be able to increase the immunity to faults further, the firing commands in the control device can be encoded and transmitted to the firing device in encoded form. The firing device contains a firing command decoder in order to decode the firing commands and to generate the firing signals for the firing elements from them.

In still another aspect of the invention, it is possible to provide for a plurality of firing elements to be fired in succession by the firing device in order to bring about more uniform loading of the power supply for the firing elements.

BRIEF DESCRIPTION OF THE DRAWINGS

The invention is explained in more detail below with reference to the exemplary embodiments illustrated in the figures of the drawing, in which.

DETAILED DESCRIPTION OF THE PREFERRED EMBODIMENTS

Figure 1:
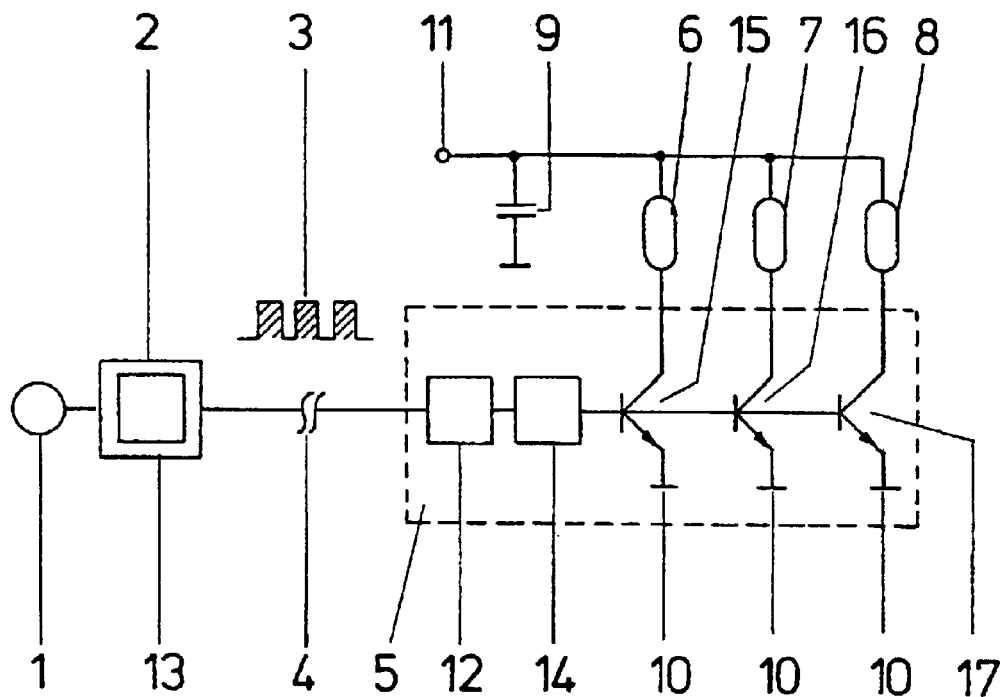
FIG. 1 shows an exemplary embodiment of a device according to the invention for simultaneously firing a plurality of firing elements.

In the exemplary embodiment shown in FIG. 1, an impact sensor 1 is provided, downstream of which impact sensor 1 a control device 2 for evaluating the signals supplied by the impact sensor 1 is connected. In the event of an impact, this is signalled to the control device 2 by means of appropriate signals of the sensor 1, in response to which the control device 2 transmits, for example, three firing commands 3 to a firing device 5 via a line 4. These firing commands 3 are identified by the firing device 5. After a specific number of identical firing commands 3 (for example, a number of firing commands 3 transmitted in total corresponding to the firing command in the exemplary embodiment), three firing caps 6, 7, 8 which are provided as firing elements then being fired by the firing device 5. For this purpose, a firing signal (current, voltage) of sufficient strength is applied to the firing caps 6, 7, 8 when the first delayed firing command occurs. The firing caps are supplied a supply voltage source (not illustrated) with a reference potential 10 and a supply potential 11. In order to prevent voltage dips in the supply voltage source when the firing caps 6, 7, 8 are fired, a buffer capacitor 9 is also connected between the reference potential 10 and the supply potential 11.

The firing device 5 includes a decoding device 12 which decodes the firing commands 3 which are encoded by the control device 2 by means of a coding device 13. A delay device 14, which delays the firing commands 3 until the firing commands 3 have been transmitted from the control device 2 to the firing device 5, is connected downstream of the decoding device 12.

This means that the firing command which is first transmitted appears at the output of the delay device 14 when the last of the firing commands 3 has already been transmitted from the control device 2 to the firing device 5.

The output of the delay device 14 controls the base terminals of three transistors 15, 16, 17 whose emitter-collector paths are connected in series with the firing caps 6, 7, 8 between the reference potential 10 and the supply potential 11. When the corresponding number of firing commands occurs, the first firing signal which is delayed by the delay device 14 is therefore made available by the decoding device. The delayed signal then connects through the transistors 15, 16 and 17, as a result of which the latter make available a firing signal for the firing caps 6, 7, 8. In this case, the firing caps 6, 7, 8 are connected to the supply voltage source, as a result of which the latter fire essentially simultaneously.

However, it is also alternatively possible to provide for the delay device to be switched upstream of the decoding device and for the latter to control the output of the decoding device 12 directly. This means that the firing commands 3 arrive at the decoding device 12 with delay and then the transistors 15, 16, 17 connect the firing caps 6, 7, 8 to the high voltage source.

Furthermore, the decoding device and the delay device may be constructed such that the transistors 15, 16 and 17 are connected through corresponding to each of the firing commands 3, the firing caps 6, 7, 8 not being able to be connected through by means of a firing command alone (power of an individual firing signal is too low) and being fired only after a plurality of firing signals (corresponding to the firing commands 3 which follow one another at short time intervals.

Figure 2:
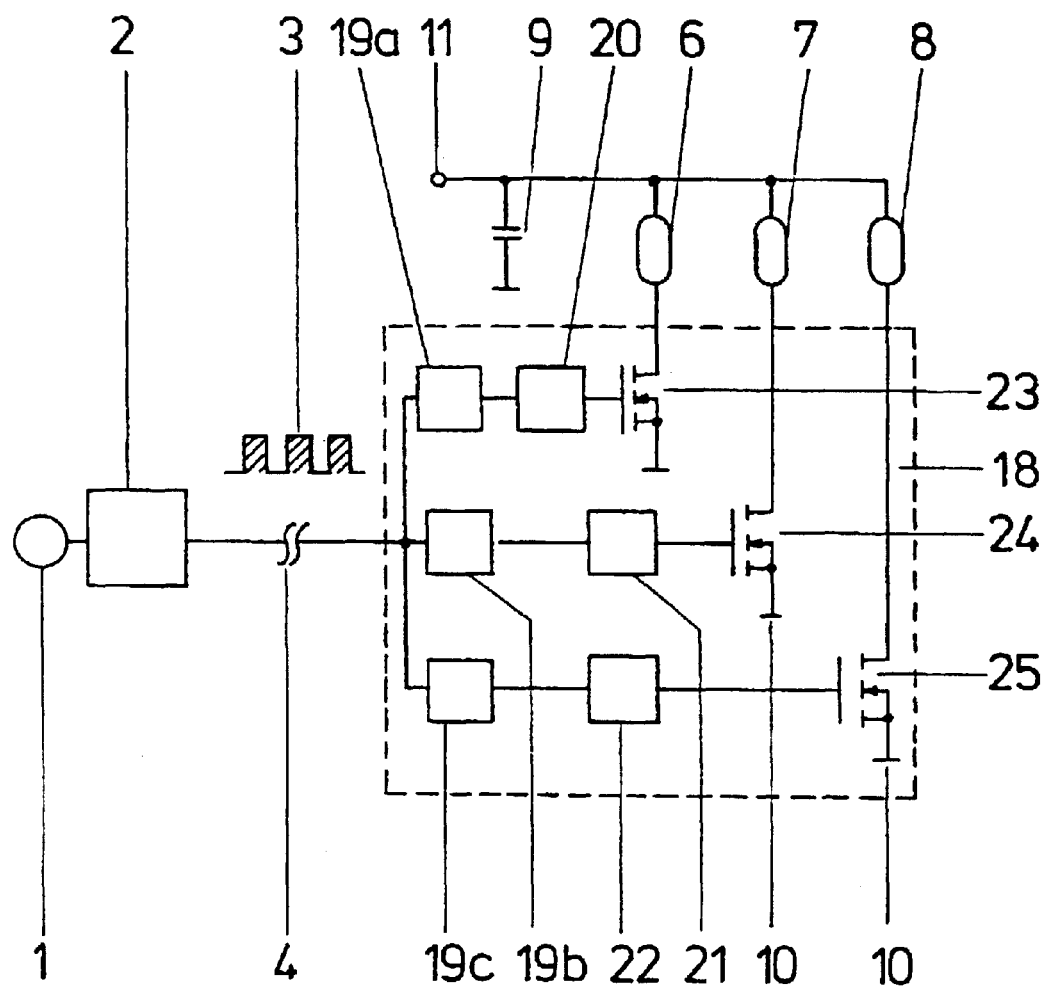
FIG. 2 shows an exemplary embodiment of a device according to the invention for firing a plurality of firing elements with staggered timing.

The exemplary embodiment shown in FIG. 2 is modified in comparison with the exemplary embodiment according to FIG. 1 in that a firing device 18 is used instead of the firing device 5. The firing device 18 comprises three decoding devices 19a, 19b, 19c which receive the firing commands 3 from the control device 2 via the line 4. The decoding devices 19a, 19b, 19c each have delay devices 20, 21, 22 connected downstream of them, the inputs of the delay devices 20, 21, 22 each being connected to the output of one of the decoding devices 19a, 19b, 19c. The delay devices 20, 21, 22 have different delays from one another, each of the delays being longer than the time which is required for the transmission of the three firing commands 3 from the control device 2 to the firing device 18. The delay devices 20, 21, 22 are each followed by a transistor 23, 24, 25 for connecting the firing caps 6, 7, 8 to the supply voltage. Owing to the delays of the delay devices 20, 21, 22 which are different from one another but longer in comparison with the transmission time period, sequential firing of the firing caps 6, 7, 8 thus occurs which has, inter alia, the advantage that the supply voltage source (and the capacitor 9) are not as heavily loaded as when there is simultaneous firing of the firing caps 6, 7, 8.

Figure 3:
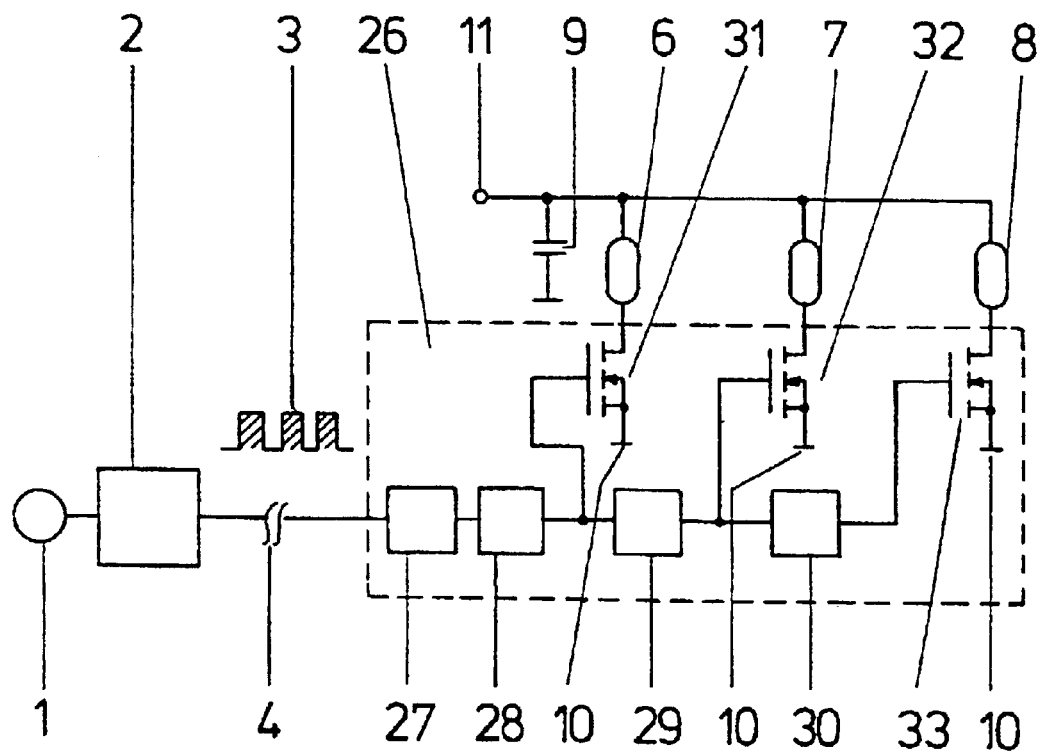
FIG. 3 shows an exemplary embodiment of a device according to the invention for firing a plurality of firing elements with staggered timing.

The exemplary embodiment according to FIG. 3 is based on the exemplary embodiment shown in FIG. 2 in that a firing device 26 is used in FIG. 3 instead of the firing device 5 in FIG. 1. The firing device 26 includes a decoding device 27 for receiving the firing commands 3 from the control device 2 via the line 4. The decoding device is followed by a delay device 28 which has a delay device 29 connected downstream of it, followed by a delay device 30. A transistor 31, 32, 33 which is provided for connecting the firing caps 6, 7, 8 to the supply voltage is connected to the output of in each case one of the delay devices 28, 29, 30.

Here, the delay device 28 which directly follows the decoding device 27 has a delay which is longer than the time required for the transmission of the firing commands 3. The delays of the delay devices 29 and 30 are, in contrast, freely selectable.

The embodiments shown are therefore suitable for carrying out a method according to the invention in which a firing command are transmitted repeatedly by the control device to the firing device for the firing element (firing caps). In the firing device, the transmitter firing commands are evaluated and, after the firing commands have been transmitted, the firing caps are fired with a delay. The delay can be implemented here either by means of a sufficiently dimensioned delay or else by counting the firing commands.

What is claimed is:

1. A method for firing at least one firing element for a restraining device in a vehicle, comprising:

transmitting a firing command from a control device to a firing device for the at least one firing element;

repeating the transmission of the firing command from the control device to the firing device n times, n being at least equal to one;

evaluating the n+1 transmitted firing command in the firing device; and firing the firing elements by the firing device after a last of the n+1 firing commands has been transmitted.

2. The method as claimed in claim 1, in which the firing of the at least one firing element is repeated at least once.

3. The method as claimed in claim 2, in which the at least one firing element is fired successively.

4. The method as claimed in claim 1, in which the at least one firing element is fired successively.

5. A device for firing at least one firing element for a restraining device in a vehicle, comprising:

a control device to generate n+1 identical firing commands;

a firing device to fire the at least one firing element by connecting a firing signal to the at least one firing element; and a transmission device for the transmission of the firing commands from the control device to the firing device, wherein the at least one firing element is not fired by the firing device until a last of the n+1 firing commands has been transmitted.

6. The device as claimed in claim 5, which the control device is a delay device to delay the firing signal, the delay device being triggered by the first firing command, and having a delay which is longer than the time which is necessary for the transmission of the firing commands.

7. The device as claimed in claim 6, in which the control device outputs coded firing commands, and the firing device has a firing command decoder to decode the firing commands.

8. The device as claimed in claim 6, in which the firing device fires a plurality of firing elements in succession.

9. The device as claimed in claim 5, in which the control device outputs coded firing commands, and the firing device has a firing command decoder to decode the firing commands.

10. The device as claimed in claim 9, in which the firing device fires a plurality of firing elements in succession.

11. The device as claimed in claim 5, in which the firing device fires a plurality of firing elements in succession.

* * * * *